United States Patent
Chakraborty et al.

(10) Patent No.: US 10,127,118 B1
(45) Date of Patent: Nov. 13, 2018

(54) METHOD AND SYSTEM FOR SHAREPOINT SERVER 2013 BACKUP AND RESTORE

(71) Applicant: EMC Corporation, Hopkinton, MA (US)

(72) Inventors: Anupam Chakraborty, Bangalore (IN); Tushar Dethe, Nagpur (IN); Sunil K. Yadav, Bangalore (IN); Pradeep Anappa, Bangalore (IN); Amarendra Behera, Bangalore (IN); Aditya Kapoor, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 821 days.

(21) Appl. No.: 14/142,534

(22) Filed: Dec. 27, 2013

(51) Int. Cl.
*G06F 17/30* (2006.01)
*G06F 11/14* (2006.01)

(52) U.S. Cl.
CPC .................. *G06F 11/1469* (2013.01)

(58) Field of Classification Search
CPC ............. G06F 17/301; G06F 17/30106; G06F 17/30864; G06F 17/30088; G06F 9/541; G06F 9/547; G06F 17/30345; G06F 2216/11; G06F 8/38
See application file for complete search history.

(56) References Cited

U.S. PATENT DOCUMENTS

| | | | |
|---|---|---|---|
| 7,478,117 B1* | 1/2009 | Lamb | G06F 11/1466 |
| 2002/0099577 A1* | 7/2002 | Black | G06Q 10/06 705/26.3 |
| 2004/0267822 A1* | 12/2004 | Curran | G06F 11/1435 |
| 2008/0147621 A1* | 6/2008 | Newman | G06F 11/1464 |
| 2009/0119173 A1* | 5/2009 | Parsons | G06Q 10/107 705/319 |
| 2011/0125717 A1* | 5/2011 | Manson | G06F 11/1458 707/679 |
| 2012/0102067 A1* | 4/2012 | Cahill | G06F 17/30575 707/770 |
| 2012/0221526 A1* | 8/2012 | Peng | G06F 11/2025 707/654 |

OTHER PUBLICATIONS

EMC, EMC Networker Module for Mircosoft Applications, Sep. 28, 2012, Release 2.4, pp. 1-158.*

* cited by examiner

*Primary Examiner* — Scott A. Waldron
*Assistant Examiner* — Fatima P Mina
(74) *Attorney, Agent, or Firm* — Womble Bond Dickinson (US) LLP

(57) ABSTRACT

A method for backing up and restoring search service applications (SSAs) is provided that backs up an SSA topology extensible markup language (XML) file to a backup system. The method then backs up an SSA search topology XML file to the backup system and backs up SSA databases to the backup system. An application programming interface (API) is queried to discover internet information services (IIS) virtual directories associated with the SSA. Discovered IIS virtual directories associated with the SSA are backed up to the backup system IIS configuration data, IIS metabase data and registry data for the SSA are also backed up to the backup system. A similar process is utilized to restore this data to enable the recovery of an SSA.

17 Claims, 3 Drawing Sheets

METHOD AND SYSTEM FOR SHAREPOINT SERVER 2013 BACKUP AND RESTORE

FIELD

The embodiments relate to the management of to the backup and restoration of date from a web applications platform or content management server such as a SharePoint server. In particular, the embodiments enable the backing up of search architecture and application data from a SharePoint server to a backup system.

BACKGROUND

Web application platforms include a set of web technologies and a common technical infrastructure. These web technologies are designed to be utilized by non-technical users and can provide intranet portals, document and file management, collaboration tools, social networks, enterprise search and business intelligence features. The web application platform can also support system integration, process integration and workflow automation capabilities. The web application platform can provide a complete development stack based on the web technologies and standards based application programming interfaces (APIs).

On example of a web application platform is SharePoint by Microsoft Corporation of Redmond, Wash. Web application platforms such as SharePoint can provide flexible service-oriented architecture (SOA) that can be scaled to operate from a single server or up to hundreds of machines. The web application platform supports the execution of web applications. Web applications are top-level containers for content in a web application platform such as SharePoint. Web applications operate independent of one another and can be restarted independently.

Service applications are also supported by web application platforms. Service applications provide granular functionality to other web and service applications in the web application platform. Service applications can include such functions as search indexing services. A service application can exist on a single server or can be load-balanced over a set of servers in the web application platform. Service application are designed to operate independently and can be restarted and similarly independently operate.

Many companies and individuals with large amounts of stored data in their web application platform employ a backup storage system. These backup storage systems can be located local to the data to be backed up or at a remote site. The backup storage systems can be managed by the entity controlling the backup storage devices or a backup storage service company. Data can be added to the storage system at any frequency and at any amount. However, due to the complicated architecture of web application platforms, not all data is easily accessed and backed up.

BRIEF DESCRIPTION OF THE SEVERAL VIEWS OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
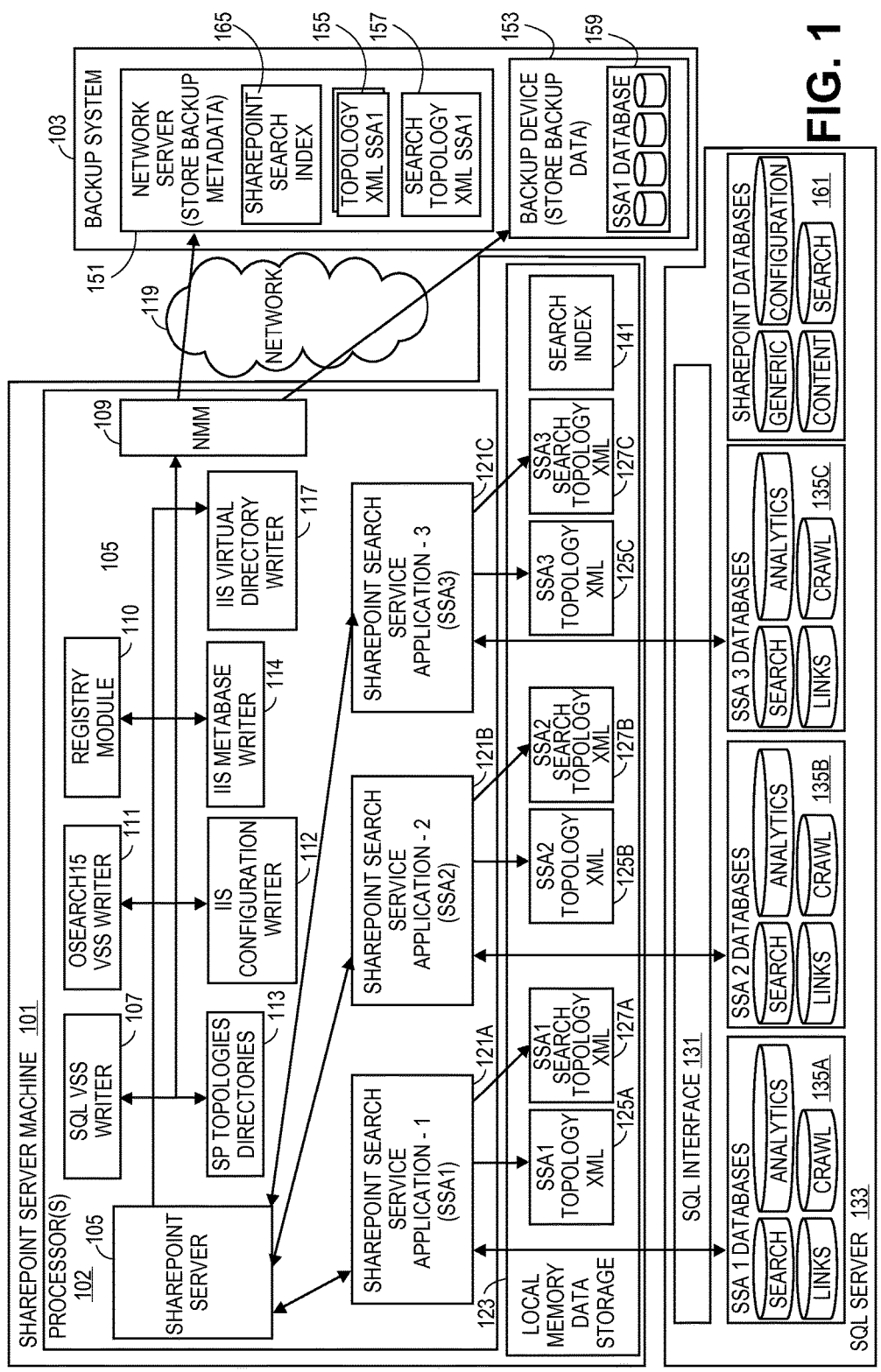
FIG. 1 is a block diagram of a web application platform server in communication with a backup system.

In the following description, numerous specific details are set forth. However, it is understood that embodiments of the invention may be practiced without these specific details. In other instances, well-known circuits, structures and techniques have not been shown in detail in order not to obscure the understanding of this description.

It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description, numerous specific details are set forth, such as virtual tape functions, virtual tape state information, virtual tape library history management, orders of operations in flowcharts, component execution details, and similar specific details related to embodiments of the invention. However, it is understood that embodiments of the invention may be practiced without these specific details. In other instances, well-known circuits, structures and techniques have not been shown in detail in order not to obscure the understanding of this description.

Overview

In one embodiment, a backup system is provided to backup data from a web application platform. For example, the backup system can be the NetWork Module for Microsoft Application (NMM) by EMC of Hopkinton, Mass. The NMM is a backup system for backing up data from a SharePoint Server by using the writers of the SharePoint Server. These writers are modules of the SharePoint Server that manage different aspects of the data maintained by the SharePoint Server. The example embodiment of a NMM being used to backup a SharePoint Server is provided herein by way of example. However, one skilled in the art would understand that the processes and principles described herein are applicable to other types of backup systems and web application platforms.

In particular, the embodiments are related to the backup of data by the NMM using the SharePoint volume shadow copy service (VSS) writer. The SharePoint Server VSS writer is a referential writer that is dependent on the structured query language (SQL) server VSS writer and SharePoint search writer.

The SharePoint Server includes a new search module referred to as the "SharePoint Server Search (OSearch15)" which combined the functionality of modules that in previous versions of SharePoint Server were separate. The new writer "OSearch15 VSS Writer" enables the backup of the search index catalog of the SharePoint Server. The method to restore Search Service Applications (SSAs) has also changed in newer versions of SharePoint. These changes in the function of the SharePoint Server rendered prior backup processes unable to properly backup all of the data of the SharePoint Server and the applications supported by the SharePoint Server in particular.

The applications for new versions of the SharePoint Server provide a new method to deliver specific information or functionality to a SharePoint site. A SharePoint site is a particular installation of SharePoint including at least one SharePoint server. The SharePoint site owners can discover and download applications for SharePoint from a public SharePoint Marketplace or from their organization's internal Application Catalog and install them on their SharePoint sites.

Newer versions of SharePoint have introduced new search architecture and SharePoint applications. The backup and restore of these new features in the newer versions of SharePoint (e.g., in SharePoint 2013) are not supported by prior backup systems such as prior versions of NMM. The embodiments provide for a process for enabling a backup system such as NMM to properly backup and restore application data and similar SharePoint data.

In one embodiment, a backup process enables the backup of web application platform applications, such as applications for a SharePoint server including Search Service Applications (SSA). In one embodiment, the process is executed by the NMM on a per SSA basis. The process begins by backing up all four Search Service Application (SSA) Databases using functions of the SharePoint SQL VSS Writer for the particular SSA. These databases include a Search Administration database, a Crawl database, a Links database and an Analytics Database. The process then exports the search topology extensible markup language (XML) file for the SSA, which is metadata related to the configuration of the SSA. In one example embodiment, the exporting of the search topology XML file is done using the 'Export-SPEnterpriseSearchTopology' command. The process can then continue by backing up the SharePoint index related to the SSA. For example, the SharePoint index can be backed up by the NMM using the OSearch15 VSS writer to access the index.

The restoration process is similar to the backup process and is also implemented by the NMM. The NMM performs the restoration on a per SSA basis by first restoring all four SSA Databases of the SSA using the SQL VSS Writer. The process then restores the Search topology XML file and then restores the SSA itself using a restore command and specifying the restored Search topology XML file. In one example embodiment, the SSA is restored by the NMM using the 'Restore-SPEnterpriseSearchServiceApplication command with the Search topology XML file as a parameter of the command. After the SSA is properly restored, the process continues by restoring the SharePoint index. The restoration of the SharePoint index can be done using OSearch15 VSS Writer.

FIG. 1 is a block diagram of a web application management server in communication with a backup system. In the illustrated embodiment, the web application management server is a SharePoint Server. 105. The SharePoint server is executed by a SharePoint server machine 101. The SharePoint server machine 101 can be a dedicated server, a workstation, desktop computer, or similar computing device. In other embodiments, the SharePoint server 105 can be implemented in a distributed environment including a cloud computing environment where any number of SharePoint server machines 101 can execute the SharePoint server 105. In any given SharePoint server machine 101 a set of processors can execute the SharePoint server 105, NMM 109 and associated modules. A 'set,' as used herein is any positive whole number of items including one item.

The SharePoint server machine 101 can also include a set of local data storage devices 123. The local data storage devices 123 can be dynamic or static random access memory or similar data storage devices. The local data storage devices 123 can also include persistent storage devices including magnetic or optical drives, solid state drives or similar persistent storage devices. The local storage devices 123 can store code of the modules executed by the processors 105 including the SharePoint Server 141, SharePoint Search Service Applications (SSAs) 121A-C, the NMM 109 and other modules.

The SharePoint server machine 101 can include a network interface (not shown) for communicating with other computing devices including a backup system 103, a SQL server 133, other SharePoint server machines and similar devices. The SharePoint Server machine 101 can communicate with other devices through direct links or via a network 119. The network 119 can be any type of network including a wired or wireless network or combination thereof. The network can be a local area network (LAN) or wide area network (WAN) including private or public networks such as the Internet.

The SharePoint server 105 is a web application management server enabling the execution of web applications such as the SSAs 121A-C that can provide functionality to a set of client computers over the network 119 (not shown). The SharePoint server 105 can manage the resources, creation and similar aspects of the SSA 121A-C. Any number of SSA 121A-C can be supported by the SharePoint Server 105 on the SharePoint server machine 101 or over a set of SharePoint server machines. The SharePoint server 105 can operate in conjunction with a set of modules that provide related functions including a SQL VSS writer 107, SP Topologies Directories module 113, the OSEARCH15 VSS writer 111, a set of SharePoint APIs 115, an Internet Information Services (IIS) directory writer 117 and similar modules.

The SQL VSS writer 107 is a module that enables access to the SQL databases for SharePoint 161 including configuration, content, generic and search databases. The SQL databases can also include those maintained by the SSAs as discussed herein below. The SP topologies directories module 113 maintains topology information related to the SSAs including the SSA topology XML files. The OSEARCH15 VSS writer 111 manages search index information stored in the search index 141. The SharePoint APIs 115 provide access to SharePoint server 105 and SSA 121A-C functionality to external applications such as backup software including NMM 109. The IIS directory writer 117 manages the IIS directory information for the SharePoint server 105.

In one embodiment, the SharePoint server 105 supports a set of SSAs 121A-C that provide a range of functions and features to any number of client computers or applications or to other SSAs. Each SSA 121A-C utilizes a set of data structures and databases to manage data associated with its functionality. The data structures can include SSA topology XML files 125A-C and the SSA search topology XML files 127A-C. The SSA topology XML files 125A-C track the location of relevant content and data utilized by the SSA and the SSA search topology XML tracks information related to searches associated with the SSA including searches of the SSA databases.

Each SSA 121A-C utilizes a set of databases 135A-C to store relevant data that are managed and stored by a database management system such as an SQL server 133. The SQL server 133 can be local or remote from the SharePoint Server machine 101. The SQL server 133 includes an SQL interface to receive and respond to queries from applications such as the SSA 121A-C. The databases of the SSA 121A-C include a search or search administration database, an analytics reporting database, a crawling database and a link database. The search database hosts the search service application configuration and access control list for the crawl database. The analytics reporting database stores the results for usage analysis reports and extracts information from the link database. The crawl database stores the state of the crawled data and the crawl history of the SSA. The link database stores the information that is extracted by the content processing and click through information of the SSA.

The NMM 109 performs backup and restore operations for the SSA 121A-C individually or as a group. The NMM 109 can backup the necessary information for restoring each SSA as set forth herein below with regard to FIG. 2 and FIG. 3. The NMM 109 can backup the data to a local or remote backup system 103. The backup system can be any backup system including backup systems that provide deduplication and similar data compression and related services.

In one embodiment, the backup system 103 is remotely located and administered over a network 119 such as a WAN. In other embodiments, the backup system 103 is locally located and administered over a LAN or a WAN. The backup system 103 can have any organization or functionality capable of receiving the SSA backup information and retrieving the same information for restoration processes. In one example embodiment, the backup system 103 includes a network server 151 and a set of backup devices 153. The network server 151 can store metadata related to the SSA 121A-C including backups of the topology XML files 155 of each SSA and the index file 157 of each SSA. An index 141 can be maintained for all SSA 121A-C or for each SSA that identifies the location of relevant SSA information in the SharePoint system. The set of backup devices 153 can store each of the databases of the respective SSA including the search, analytics, links and crawl databases of each SSA.

Figure 2:
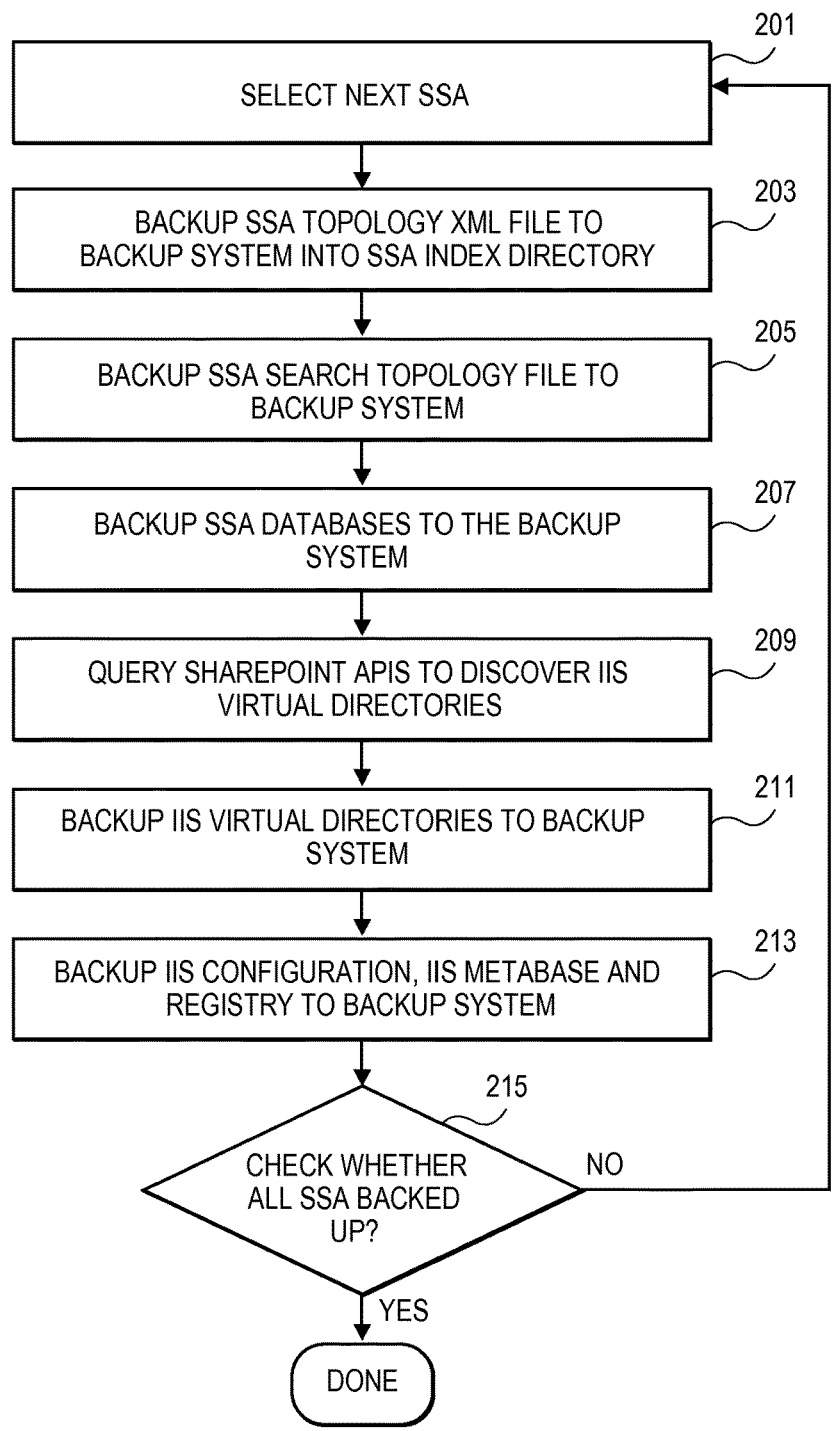
FIG. 2 is a flowchart of one embodiment of a backup process for a web application platform server.

FIG. 2 is a flowchart of one embodiment of a backup process for the web application server. In one embodiment, the backup process can be initiated by the NMM at any point during the operation of the SharePoint server. The backup process can be scheduled at regular intervals, initiated in response to any change in the SharePoint server or based on any trigger defined by an administrator. The backup process is described as it relates to the backing up of the SSA. One skilled in the art would understand that the backup process can also handle the backing up of other SharePoint related data.

The backup process can iterate through the SSA being executed by the SharePoint server. The backup process can select a next SSA from the set of available SSA using any algorithm or process to determine the next SSA to be backed up (Block 201). For the selected SSA the backup process backups up the topology XML file to the backup system. As used herein, 'backing up' data involves the reliable copying and transfer of the data from the SharePoint server machine to the backup system without affecting (i.e., without deleting or corrupting the data being backed up). In one embodiment, the topology XML file is stored in the network server in the index directory for the SSA. Similarly, the process can then continue by backing up the SSA search topology XML file to the backup system (Block 205). The SSA search topology XML file can be stored in the network server in the index directory for the SSA. The NMM can access the topology XML file and the search topology XML file via the SharePoint APIs or similar component.

The process can then backup the SSA databases to the backup system (Block 207). The databases can be accessed by the NMM via the SQL VSS writer or similar component that enables the SQL databases associated with each SSA to be retrieved and backed up to the backup system. The backed up databases can include the search database, crawl database, link database and analytics database of the SSA.

The backup process for each SSA can then continue by querying the SharePoint APIs to determine the IIS virtual directories associated with the SSA (Block 209). Once the NMM receives the IIS virtual directory information, the NMM can use the IIS virtual directory writer to backup the IIS virtual directories to the backup system (Block 211). Along with the backup of the IIS virtual directories the NMM utilizes the IIS configuration writer, IIS metabase writer, and the registry module to backup the IIS configuration data, IIS metabase data and the registry data associated with the SSA, respectively (Block 213). In further embodiments, any additional data related to an SSA and requisite for restoring the SSA can also be backed up by the NMM using an associated SharePoint module to the backup system.

Once all of the data for a selected SSA has been successfully backed up to the backup system, the process can check whether all SSAs have been successfully backed up (Block 215). If there are additional SSAs that have not yet been backed up, then the process continues by selecting the next SSA to be backed up (Block 201). This process can continue until all SSAs have been backed up to the backup system by the NMM.

Figure 3:
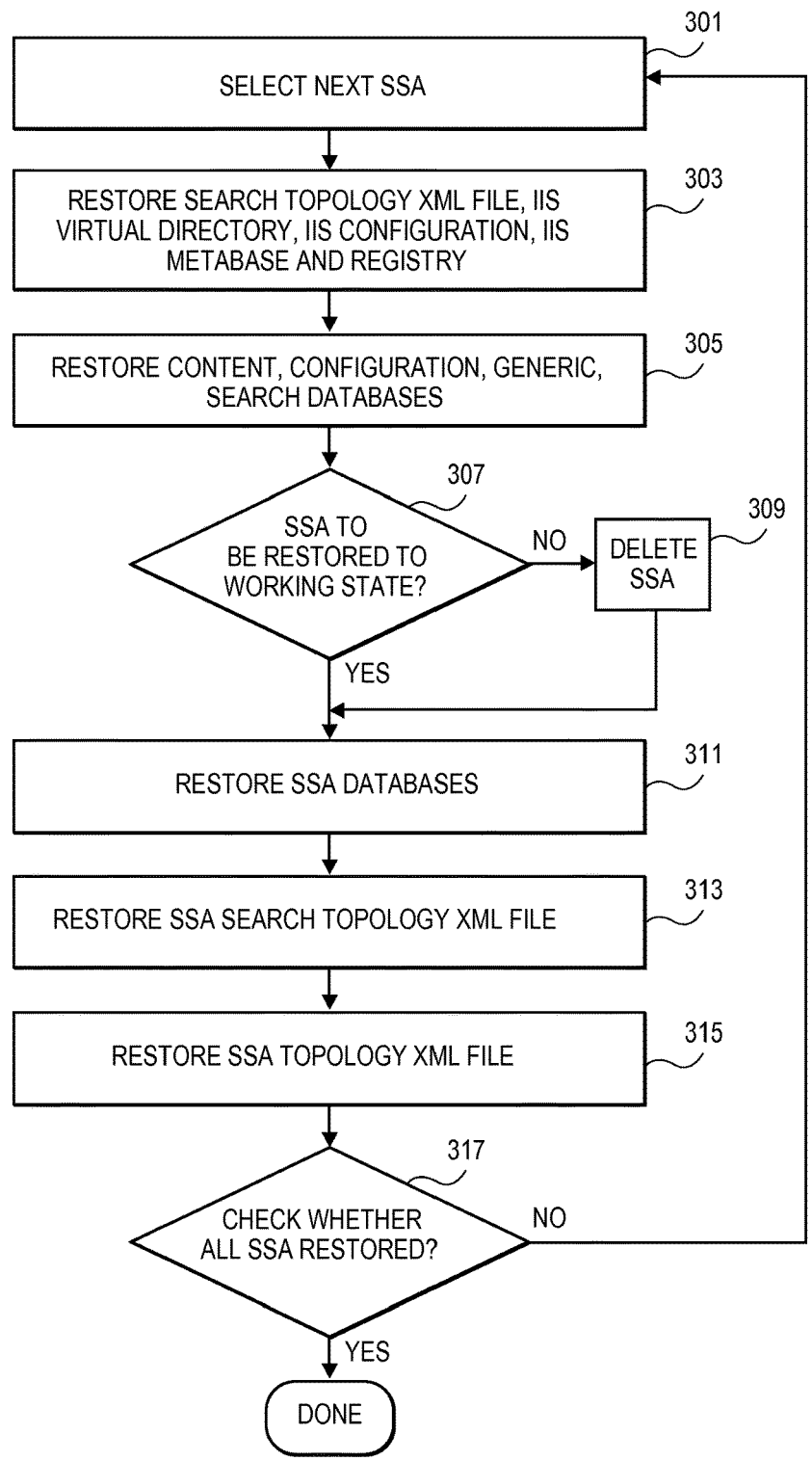
FIG. 3 is a flowchart of one embodiment of a restoration process for a web application platform server.

FIG. 3 is a flowchart of one embodiment of a restoration process for a web application server. In one embodiment, the restoration process can be initiated by the NMM at any point during the operation of the SharePoint server. The restoration process can be triggered by a failure of an SSA or set of SSAs. In other scenarios the restoration of SSAs can be performed in response to a general failure or restart of the SharePoint server or based on any trigger defined by an administrator. The restoration process is described as it relates to the restoration of a set of SSAs. One skilled in the art would understand that the restoration process can also handle the restoration of other SharePoint related data.

The restoration process can iterate through the SSA that are to be restored or supported by the SharePoint server. The restoration process can select a next SSA from the set of SSA to be restored using any algorithm or process to determine the next SSA to be restored (Block 301). For the selected SSA the restoration process restores the search topology XML file, IIS virtual directory data, IIS configuration data, IIS metabase data and the registry data to the SharePoint system. As used herein, 'restoring' data involves the reliable copying and transfer of the data from the backup system to the SharePoint server machine without affecting (i.e., without deleting or corrupting the data being restored). The NMM can utilize the respective modules that were used to obtain the data to restore the data. Thus, the NMM can use the registry module to restore the registry data, the IIS virtual directory module to restore the IIS virtual directory data, the IIS configuration writer to restore the IIS configuration data and the IIS metabase writer to restore the IIS metabase data.

The process can then restore the SharePoint databases to the SQL server (Block 305). The databases can be restored by the NMM via the SQL VSS writer or similar component that enables the SQL databases associated with each SSA to be accessed and restored from the data stored in the backup system. The backed up SharePoint databases to be restored can include the search database, generic database, content database, and configuration database. This may not be a full restoration of these databases but only a restoration related to the SSA to be restored.

A check can then be made wither the SSA to be restored is still being executed by the SharePoint server and needs to be restored to a working state (Block 307). If the executing SSA is not to be restored, then the SSA can be deleted and will be reinstantiated (Block 309). If the executing SSA can be restored, then the SSA does not need to be deleted.

The SSA can be reassociated with its own restored databases (Block 311). The SSA databases can be restored using the SQL VSS writer by the NMM. These databases can include the search database, crawl database, link database and analytics database of the SSA. Similarly, the SSA can be restored to functionality and the use of the restored data by restoring the SSA search topology XML file (Block 313) and the SSA topology file (Block 315). These files can be restored and reassociated with the SSA by the NMM using a restore command identifying the SSA topology file (e.g., the Restore SPEnterpriseSearchServiceApplication' command) and the SSA search topology file can be restored using the OSEARCH15 VSS writer.

Once all of the data for a selected SSA has been successfully restored and the SSA itself restored to operation, the process can check whether all SSAs have been successfully restored (Block 317). If there are additional SSAs that have not yet been restored, then the process continues by selecting the next SSA to be restored (Block 301). This process can continue until all SSAs have been restored from the backup system by the NMM.

In the description and claims, the terms "coupled" and/or "connected," along with their derivatives, have been used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated.

One or more embodiments include an article of manufacture (e.g., a computer program product) that includes a machine-accessible and/or machine-readable medium. The medium may include a mechanism that provides, for example stores or transmits, information in a form that is accessible and/or readable by the machine. The machine-accessible and/or machine-readable medium may provide, or have stored thereon, a sequence of instructions that if executed by a machine cause or result in the machine performing one or more operations, methods, or techniques disclosed herein.

In one embodiment, the machine-readable medium may include a tangible non-transitory machine-readable storage media. For example, the tangible non-transitory machine-readable storage media may include a floppy diskette, an optical storage medium, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, or a combinations thereof. The tangible medium may include one or more solid or tangible physical materials, such as, for example, a semiconductor material, a phase change material, a magnetic material, etc.

In another embodiment, the machine-readable media may include a non-tangible transitory machine-readable communication medium. For example, the transitory machine-readable communication medium may include electrical, optical, acoustical or other forms of propagated signals, such as carrier waves, infrared signals, digital signals, etc.)

Examples of suitable machines include, but are not limited to, computer systems, desktops, laptops, network elements, storage appliances, equipment of remote archive repositories, and other electronic devices, equipment, elements, or systems having one or more microprocessors. Such electronic devices typically include one or more processors coupled with one or more other components, such as one or more storage devices (non-transitory machine-readable storage media), user input/output devices (e.g., a keyboard, a touchscreen, and/or a display), and/or network connections. The coupling of the processors and other components is typically through one or more buses/interconnects and bridges (also termed bus controllers). Thus, the storage device of a given electronic device may store code and/or data for execution on the one or more processors of that electronic device.

It should also be appreciated that reference throughout this specification to "one embodiment," "an embodiment," or "one or more embodiments," for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A method for backing up and restoring search service applications (SSAs) comprising:
   backing up an SSA topology extensible markup language (XML) file to a backup system, wherein the SSA topology XML file is exported in response to an export topology command and includes metadata to track a location of content and data utilized by the corresponding SSA, wherein the SSA is executed b SharePoint server;
   backing up an SSA search topology XML file to the backup system, wherein the SSA search topology XML the tracks information related to performed searches of the corresponding SSA databases;
   backing up SSA databases to the backup system; querying an application programming interface (API) to discover internet information services (IIS) virtual directories associated with the SSA;
   backing up discovered virtual directories associated with the SSA to the backup system;
   backing up configuration data, metabase data and registry data for the SSA to the backup system; and
   restoring the SSA by executing a restoration command with the SSA search topology XML file and the SSA topology XML file, wherein the SSA search topology XML the is provided as a parameter to the restoration command.

2. The method of claim 1, further comprising:
   selecting a next SSA to backup to the backup system.

3. The method of claim 2, further comprising:
   checking whether all SSA have been backed up to the backup system.

4. The method of claim 1, further comprising:
   restoring the IIS virtual directories, IIS configuration data, IIS metabase data and registry data from the backup system.

5. The method of claim 4, further comprising:
   restoring the SSA databases to an structured query language (SQL) server from the backup system.

6. The method of claim 5, further comprising:
   deleting the SSA that is not to be restored to a working state.

7. The method of claim 1, wherein the SSA databases include an analytics database, a crawl database, a search database and a links database.

8. A non-transitory computer-readable medium, having instructions stored therein, which when executed cause a computer to perform a set of operations comprising:
   backing up an SSA topology extensible markup language (XML) file to a backup system, wherein the SSA topology XML file is exported in response to an export topology command and includes metadata to track a location of content and data utilized by the corresponding SSA, wherein the SSA is executed b SharePoint server;
   backing up an SSA search topology XML file to the backup system, wherein the SSA search topology XML file tracks information related to performed searches of the corresponding SSA databases;
   backing up SSA databases to the backup system; querying an application programming interface (API) to discover internet information services (IIS) virtual directories associated with the SSA;
   backing up discovered IIS virtual directories associated with the SSA to the backup system; backing up IIS configuration data; IIS metabase data and registry data for the SSA to the backup system; and
   restoring the SSA by executing a restoration command with the SSA search topology XML file and the SSA topology XML file, wherein the SSA search topology XML file is provided as a parameter to the restoration command.

9. The non-transitory computer-readable medium of claim 8, having stored therein further instructions, which when executed cause the computer to perform further operations comprising:
   selecting a next SSA to backup to the backup system.

10. The non-transitory computer-readable medium of claim 9, having stored therein further instructions, which when executed cause the computer to perform further operations comprising:
    checking whether all SSA have been backed up to the backup system.

11. The non-transitory computer-readable medium of claim 8, having stored therein further instructions, which when executed cause the computer to perform further operations comprising: restoring the 11S virtual directories, IIS configuration data, 11S metabase data and registry data from the backup system.

12. The non-transitory computer-readable medium of claim 11, having stored therein further instructions, which when executed cause the computer to perform further operations comprising:
    restoring the SSA databases to an structured query language (SQL) server from the backup system.

13. The non-transitory computer-readable medium of claim 12, having stored therein further instructions, which when executed cause the computer to perform further operations comprising:
    deleting the SSA that is not to be restored to a working state.

14. The non-transitory computer-readable medium of claim 8, wherein the SSA databases include an analytics database, a crawl database, a search database and a links database.

15. A system for backing up and restoring search service applications (SSAs) comprising:
    a processor; and a memory coupled to the processor, the memory storing instructions, which when executed by the processor, cause the processor to perform operations comprising:
    backing up an SSA topology extensible markup language (XML) file to a backup system, wherein the SSA topology XML the is exported in response to an export topology command and includes metadata to track a location of content and data utilized by the corresponding SSA, wherein the SSA is executed by SharePoint server;

backing up an SSA search topology XML file to the backup system, wherein the SSA search topology XML file tracks information related to performed searches of the corresponding SSA databases;

backing up SSA databases to the backup system;

querying an application programming interface (API) to discover internet information services virtual directories associated with the SSA;

backing up discovered virtual directories associated with the SSA to the backup system;

backing up configuration data, metabase data and registry data for the SSA to the backup system; and restoring the SSA by executing a restoration command with the SSA search topology XML file and the SSA topology XML file, wherein the SSA search topology XML the is provided as a parameter to the restoration command.

16. The system of claim 15, the operations further comprising:

restoring the IIS virtual directories, IIS configuration data, IIS metabase data and registry data from the backup system.

17. The system of claim 16, the operations further comprising:

restoring the SSA databases to a structured query language (SQL) server from the backup system, and deleting the SSA that is not to be restored to a working state.

* * * * *